US012087465B2

(12) United States Patent
Hornung et al.

(10) Patent No.: US 12,087,465 B2
(45) Date of Patent: Sep. 10, 2024

(54) ELECTRICAL CABLE

(71) Applicant: TE CONNECTIVITY CORPORATION, Berwyn, PA (US)

(72) Inventors: Craig Warren Hornung, Harrisburg, PA (US); Justin Dennis Pickel, Hummelstown, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 221 days.

(21) Appl. No.: 16/383,850

(22) Filed: Apr. 15, 2019

(65) Prior Publication Data

US 2020/0118716 A1 Apr. 16, 2020

Related U.S. Application Data

(60) Provisional application No. 62/744,979, filed on Oct. 12, 2018.

(51) Int. Cl.

*H01B 11/06* (2006.01)
*H01B 7/02* (2006.01)
*H01B 11/00* (2006.01)
*H01B 11/18* (2006.01)
*H01B 13/00* (2006.01)

(Continued)

(52) U.S. Cl.

CPC ....... *H01B 11/1895* (2013.01); *H01B 7/0275* (2013.01); *H01B 11/002* (2013.01); *H01B 11/1834* (2013.01); *H01B 13/0016* (2013.01); *H01B 13/14* (2013.01); *H01B 13/222* (2013.01)

(58) Field of Classification Search

CPC ................................ H01B 11/04; H01B 11/06

See application file for complete search history.

(56) References Cited

U.S. PATENT DOCUMENTS 3,340,353 A 9/1967 Mildner
3,439,111 A 4/1969 Miracle et al.
4,221,926 A 9/1980 Schneider (Continued)

FOREIGN PATENT DOCUMENTS

CN 201327733 10/2009
CN 201359878 12/2009

(Continued)

OTHER PUBLICATIONS

Co-pending U.S. Appl. No. 15/925,243, filed Mar. 19, 2018.

(Continued)

*Primary Examiner* — Chau N Nguyen

(57) ABSTRACT

An electrical cable includes a conductor assembly having a first conductor, a second conductor and an insulator surrounding the first conductor and the second conductor. The insulator has an outer surface having an RMS roughness of less than 1.0 micrometers. A cable shield provides electrical shielding for the first and second conductors and has a metallized conductive layer on the outer surface of the insulator. A method of manufacturing an electrical cable includes feeding a first conductor and a second conductor to a core extruder, extruding an insulator around the first and second conductors at the core extruder, heating an outer surface of the insulator to lower a roughness profile of the outer surface, and directly apply a conductive layer to the outer surface of the insulator.

16 Claims, 3 Drawing Sheets

(51) Int. Cl.
*H01B 13/14* (2006.01)
*H01B 13/22* (2006.01)

(56) References Cited

U.S. PATENT DOCUMENTS 4,596,897 A 6/1986 Gruhn
4,644,092 A 2/1987 Gentry
5,142,100 A 8/1992 Vaupotic
5,296,260 A * 3/1994 Sawada .................. H01B 7/292 427/126.3
5,329,064 A 7/1994 Tash et al.
5,349,133 A 9/1994 Rogers
5,619,016 A 4/1997 Newmoyer
6,010,788 A 1/2000 Kebabjian et al.
6,403,887 B1 6/2002 Kebabjian et al.
6,504,379 B1 1/2003 Jackson
6,677,518 B2 1/2004 Hirakawa et al.
7,314,998 B2 1/2008 Amato et al.
7,790,981 B2 9/2010 Vaupotic et al.
7,827,678 B2 11/2010 Dion et al.
7,999,185 B2 8/2011 Cases et al.
8,378,217 B2 2/2013 Sugiyama et al.
8,381,397 B2 2/2013 Dion et al.
8,440,910 B2 5/2013 Nonen et al.
8,546,691 B2 10/2013 Watanabe et al.
8,552,291 B2 10/2013 Lingambudi et al.
8,575,488 B2 11/2013 Sugiyama et al.
8,674,228 B2 3/2014 Dion et al.
8,866,010 B2 10/2014 Nonen et al.
8,981,216 B2 3/2015 Grant et al.
8,993,883 B2 3/2015 Kumakura et al.
9,064,621 B2 6/2015 Kodama et al.
9,084,359 B2 * 7/2015 Okamoto ................. H05K 3/10
9,117,572 B2 8/2015 Fukasaku
9,123,452 B2 9/2015 Sugiyama et al.
9,123,457 B2 9/2015 Kaga et al.
9,136,042 B2 9/2015 Sugiyama et al.
9,142,333 B2 9/2015 Kaga et al.
9,159,472 B2 10/2015 Nordin et al.
9,214,260 B2 12/2015 Ishikawa et al.
9,299,481 B2 3/2016 Ishikawa et al.
9,349,508 B2 5/2016 Nonen et al.
9,350,571 B2 5/2016 Watanabe et al.
9,466,408 B2 10/2016 Sugiyama
9,484,127 B2 11/2016 Sugiyama et al.
9,496,071 B2 11/2016 Nagagashi
9,548,143 B2 1/2017 Sugiyama et al.
9,583,235 B2 2/2017 Nonen et al.
9,660,318 B2 5/2017 Sugiyama et al.
2003/0150633 A1 8/2003 Hirakawa et al.
2006/0254801 A1 11/2006 Stevens
2009/0137095 A1* 5/2009 Shimomura ...... H01L 21/76254 438/455
2009/0232552 A1* 9/2009 Mitsumori ............. G03G 5/104 399/159
2010/0075176 A1* 3/2010 Yamada .............. C03C 17/2456 428/697
2010/0307790 A1 12/2010 Okano
2011/0100682 A1 5/2011 Nonen et al.
2011/0127062 A1 6/2011 Cases et al.
2012/0024566 A1 2/2012 Shimosawa et al.
2012/0080211 A1 4/2012 Brown et al.
2012/0152589 A1 6/2012 Kumakura et al.
2012/0227998 A1 9/2012 Lindstrom et al.
2013/0137581 A1* 5/2013 Higuchi .................. H01L 39/02 505/237
2013/0175081 A1 7/2013 Watanabe et al.
2013/0233589 A1* 9/2013 Kaga ........................ H01B 7/00 29/868
2013/0333913 A1 12/2013 Nonen et al.
2014/0048302 A1 2/2014 Nonen et al.
2014/0102783 A1 4/2014 Nagahashi et al.
2014/0305676 A1 10/2014 Sugiyama et al.
2015/0000954 A1 1/2015 Nonen et al.
2015/0255928 A1 9/2015 Liptak et al.
2016/0111187 A1 4/2016 Kodama
2016/0155540 A1 6/2016 Matsuda et al.
2016/0300642 A1 10/2016 Kodama et al.
2016/0343474 A1 11/2016 Nichols
2016/0372235 A1 12/2016 Sugiyama et al.
2017/0103830 A1 4/2017 Dettmer et al.
2018/0096755 A1 4/2018 Tsujino et al.
2019/0013560 A1* 1/2019 Suenaga ................... H01P 3/02
2019/0228877 A1* 7/2019 Sagawa ................ H01B 7/1885

FOREIGN PATENT DOCUMENTS

CN 102231303 11/2011
CN 104098871 A 10/2014
CN 203931605 11/2014
CN 105741965 7/2016
JP 2000040423 2/2000
JP 2001093357 4/2001
JP 2012009321 1/2012
JP 2012059756 A 3/2012
JP 2012238468 12/2012
JP 2013038082 2/2013
JP 2013258009 12/2013
JP 2014038802 2/2014
JP 2014078339 5/2014
JP 2014099404 5/2014
JP 2014142247 8/2014
JP 2014154490 8/2014
JP 2014157709 8/2014
JP 2015076138 4/2015
JP 2015146298 8/2015
JP 2015204195 11/2015
JP 2015230836 12/2015
JP 2016015255 1/2016
JP 2016027547 2/2016
JP 2016072007 5/2016
JP 2016072196 5/2016
JP 2016110960 6/2016
JP 2016213111 12/2016
JP 2018-041962 * 3/2018
JP 2018092882 A 6/2018
WO 96041351 12/1996

OTHER PUBLICATIONS

Co-pending U.S. Appl. No. 15/925,265, filed Mar. 19, 2018.
Co-pending U.S. Appl. No. 15/969,264, filed May 2, 2018.
Co-pending U.S. Appl. No. 15/952,690, filed Apr. 13, 2018.
Co-pending U.S. Appl. No. 16/159,003, filed Oct. 12, 2018.
Co-pending U.S. Appl. No. 16/159,053, filed Oct. 12, 2018.

* cited by examiner

ELECTRICAL CABLE

CROSS REFERENCE TO RELATED APPLICATIONS

This application claims benefit to U.S. Provisional Application No. 62/744,979, filed Oct. 12, 2018, titled "ELECTRICAL CABLE", the subject matter of which is herein incorporated by reference in its entirety.

BACKGROUND OF THE INVENTION

The subject matter herein relates generally to signal transmission electrical cables and shielding efficiency for signal conductors.

Shielded electrical cables are used in high-speed data transmission applications in which electromagnetic interference (EMI) and/or radio frequency interference (RFI) are concerns. Electrical signals routed through shielded cables radiate less EMI/RFI emissions to the external environment than electrical signals routed through non-shielded cables. In addition, the electrical signals being transmitted through the shielded cables are better protected against interference from environmental sources of EMI/RFI than signals through non-shielded cables.

Shielded electrical cables are typically provided with a cable shield formed by a tape wrapped around the conductor assembly. Signal conductors are typically arranged in pairs conveying differential signals. The signal conductors are surrounded by an insulator and the cable shield is wrapped around the insulator. However, manufacturing tolerances of the conductors and the insulator can lead to performance degradation in high speed signal cables. For example, the air pocket formed from the cable shield wrap leads to performance degradation in the form of electrical signal timing skew due to differences in effective dielectric surrounding the first and second signal conductors.

A need remains for an electrical cable that improves signal performance.

BRIEF DESCRIPTION OF THE INVENTION

In an embodiment, an electrical cable is provided including a conductor assembly having a first conductor, a second conductor and an insulator surrounding the first conductor and the second conductor. The insulator has an outer surface having a root means square (RMS) roughness of less than 1.0 micrometers for a length of the electrical cable. A cable shield provides electrical shielding for the first and second conductors. The cable shield has a metallized conductive layer on the outer surface of the insulator. The cable shield extends along the longitudinal axis.

In another embodiment, an electrical cable is provided including a conductor assembly having a first conductor, a second conductor and an insulator surrounding the first conductor and the second conductor. The insulator has an extruded body surrounding the first and second conductors and having an outer surface being smoothed to lower a surface roughness of the outer surface. A cable shield provides electrical shielding for the first and second conductors. The cable shield has a metallized conductive layer directly applied to the smoothed outer surface of the insulator. The cable shield extends along the longitudinal axis.

In a further embodiment, a method of manufacturing an electrical cable is provided including feeding a first conductor and a second conductor to a core extruder, extruding an insulator around the first and second conductors at the core extruder, heating an outer surface of the insulator to lower a roughness profile of the outer surface, and directly apply a conductive layer to the outer surface of the insulator.

DETAILED DESCRIPTION OF THE INVENTION

Figure 1:
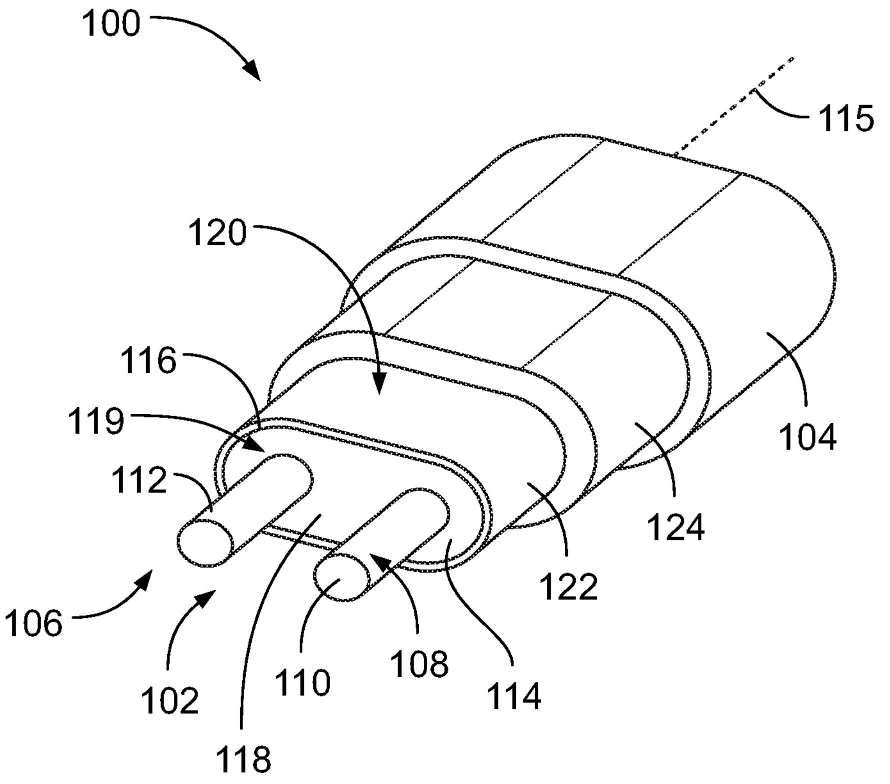
FIG. 1 is a perspective view of a portion of an electrical cable formed in accordance with an embodiment.

FIG. 1 is a perspective view of a portion of an electrical cable 100 formed in accordance with an embodiment. The electrical cable 100 may be used for high speed data transmission between two electrical devices, such as electrical switches, routers, and/or host bus adapters. The electrical cable 100 has a shielding structure configured to control capacitance and inductance relative to the signal conductors to control signal skew in the electrical cable 100 for high speed applications.

The electrical cable 100 includes a conductor assembly 102. The conductor assembly 102 is held within an outer jacket 104 of the electrical cable 100. The outer jacket 104 surrounds the conductor assembly 102 along a length of the conductor assembly 102. In FIG. 1, the conductor assembly 102 is shown protruding from the outer jacket 104 for clarity in order to illustrate the various components of the conductor assembly 102 that would otherwise be obstructed by the outer jacket 104. It is recognized, however, that the outer jacket 104 may be stripped away from the conductor assembly 102 at a distal end 106 of the cable 100, for example, to allow for the conductor assembly 102 to terminate to an electrical connector, a printed circuit board, or the like.

The conductor assembly 102 includes inner conductors arranged in a pair 108 that are configured to convey data signals. In an exemplary embodiment, the pair 108 of conductors defines a differential pair conveying differential signals. The conductor assembly 102 includes a first conductor 110 and a second conductor 112. In an exemplary embodiment, the conductor assembly 102 is a twin-axial differential pair conductor assembly. The conductors 110, 112 extend the length of the electrical cable 100 along a longitudinal axis 115.

The conductor assembly 102 includes an insulator 114 surrounding the conductors 110, 112. The insulator 114 is a monolithic, unitary insulator structure having an outer surface 116. In an exemplary embodiment, the insulator 114 includes an extruded body 118 that is extruded around the conductors 110, 112 during an extrusion process to form a core 119 of the conductor assembly 102. The outer surface 116 is smoothed after being extruded to lower a roughness profile of the outer surface 116. For example, in an exemplary embodiment, the extruded body 118 is heated to smooth the outer surface 116 and lower the roughness profile of the outer surface 116. In other various embodiments, the extruded body 118 may be smoothed by chemical processing, an abrasion process, and the like.

The electrical cable 100 includes a cable shield 120 providing electrical shielding for the pair 108 of conductors 110, 112 along the length of the electrical cable 100. In various embodiments, the cable shield 120 includes a conductive layer 122 on the outer surface 116 of the insulator 114. The conductive layer 122 is electrically conductive to define a shield layer of the cable shield 120. The conductive layer 122 provides circumferential shielding around the pair 108 of conductors 110, 112 along the length of the electrical cable 100. In an exemplary embodiment, the conductive layer 122 is applied directly to the outer surface 116. The conductive layer 122 engages the outer surface 116. As used herein, two components "engage" or are in "engagement" when there is direct physical contact between the two components. The conductive layer 122 is a direct metallization shield structure on the outer surface 116 of the insulator 114. The conductive layer 122 conforms to the shape of the insulator 114 around the entire outer surface 116. The conductive layer 122 is seamless along the length of the electrical cable 100. For example, the conductive layer 122 does not include any seams or air gaps that are common with longitudinal or helical wraps. In an exemplary embodiment, the conductive layer 122 is homogenous through a thickness of the conductive layer 122. In various embodiments, the conductive layer 122 may include conductive ink applied to the insulator 114, such as during an ink printing or other ink applying process. The conductive ink may be silver ink or other metal ink. The conductive ink may be cured to form a homogenous coating layer. In various embodiments, the conductive ink is a metal solution having dissolved metal in a solution. The conductive ink may be recrystallized on the outer surface of the insulator 114 to form the conductive layer on the outer surface of the insulator 114. The recrystallization may occur due to curing or processing, such as using an IR heating process. In an exemplary embodiment, the electrical cable 100 is manufactured on a reel-to-reel processing line and the conductive ink application and recrystallization occurs, post-extrusion, as the electrical cable 100 is transferred reel-to-reel.

In other various embodiments, the conductive layer 122 may include metal particles sprayed on the insulator 114, such as through a thermal spraying process. The conductive layer 122 may be applied by other processes, such as a physical vapor deposition (PVD) process. The conductive layer 122 may be applied in multiple passes or layers to thicken the conductive layer 122. The conductive layer 122 may be plated to build up the conductive layer 122 on the insulator 114 in various embodiments.

The conductors 110, 112 extend longitudinally along the length of the cable 100. The conductors 110, 112 extend generally parallel to one another along the length of the electrical cable 100. The conductors 110, 112 are formed of a conductive material, for example a metal material, such as copper, aluminum, silver, or the like that form electrical signal transmission paths for the conductors 110, 112. In various embodiments, the conductors 110, 112 may be metalized dielectric conductors. For example, each conductor 110, 112 is fabricated by metallizing a dielectric core with conductive material that forms the corresponding signal transmission path. The dielectric core may be a glass or plastic core and the metallization forms a conductive layer on the outer surface of the dielectric core. For example, the dielectric core may be an extruded plastic core. In various embodiments, the dielectric core is a fiber optic cable. The diameters of the dielectric cores may be tightly controlled during manufacturing to control the relative sizes of the conductive layers and the positioning of the conductive layers within the conductor assembly 102, such as to the conductive layer 122. In other various embodiments, the conductors 110, 112 may be a solid or stranded conductors. By matching the sizes of the conductive layers to be within a tight tolerance window of each other, the inductance of the conductors 110, 112 may be matched in the conductors 110, 112 for electrical signal delay control (for example, skew control).

The insulator 114 surrounds and engages outer perimeters of the corresponding first and second conductors 110, 112, such as the conductive surfaces of the conductors 110, 112. The insulator 114 is formed of a dielectric material, for example one or more plastic materials, such as polyethylene, polypropylene, polytetrafluoroethylene, or the like. The insulator 114 may be formed directly to the inner conductors 110, 112 by a molding process, such as extrusion, overmolding, injection molding, or the like. In an exemplary embodiment, the insulator 114 is co-extruded or dual extruded with both conductors 110, 112. The insulator 114 extends between the conductors 110, 112 and the cable shield 120. The insulator 114 maintains the conductor to conductor spacing and the conductor to shield spacing. For example, the insulator 114 separates or spaces the conductors 110, 112 from one another and separates or spaces the conductors 110, 112 from the conductive layer 122 of the cable shield 120. The insulator 114 maintains separation and positioning of the conductors 110, 112 along the length of the electrical cable 100. The size and/or shape of the conductors 110, 112, the size and/or shape of the insulator 114, and the relative positions of the conductors 110, 112 may be modified or selected in order to attain a particular impedance and/or capacitance for the electrical cable 100. For example, the conductors 110, 112 may be moved relatively closer or relatively further from each other to affect electrical characteristics of the electrical cable 100. The conductive layer 122 may be moved relatively closer or relatively further from the conductors 110, 112 to affect electrical characteristics of the electrical cable 100.

In various embodiments, the cable shield 120 may include an outer shield 124 surrounding the conductive layer 122. The outer shield 124 may protect the conductive layer 122, such as from physical damage. In various embodiments, the outer shield 124 may be a tape or film that is helically wrapped around the conductive layer 122 or wrapped as a longitudinal wrap around the conductive layer 122. The outer shield 124 is formed, at least in part, of a conductive material. In an exemplary embodiment, the outer shield 124 is a tape configured to be wrapped around the cable core. For example, the outer shield 124 may include a multi-layer tape having a conductive layer and an insulating layer, such as a backing layer. The conductive layer and the backing layer may be secured together by adhesive. Optionally, the outer shield 124 may include an adhesive layer, such as along the interior side to secure the outer shield 124 to the conductive layer 122 and/or itself. The conductive layer may be a conductive foil or another type of conductive layer. The insulating layer may be a polyethylene terephthalate (PET) film, or similar type of film. The conductive layer provides electrical shielding for the first and second conductors 110, 112 from external sources of EMPREI interference and/or to block cross-talk between other conductor assemblies 102 or electrical cables 100. The outer shield 124 may be a helical wrap. The wrap may be a heat shrink wrap. The outer shield 124 is located inside the outer jacket 104.

The outer jacket 104 surrounds and may engage the outer perimeter of the cable shield 120 or the heat shrink wrap. In the illustrated embodiment, the outer jacket 104 engages the cable shield 120 along substantially the entire periphery of the cable shield 120. The outer jacket 104 is formed of at least one dielectric material, such as one or more plastics (for example, vinyl, polyvinyl chloride (PVC), acrylonitrile butadiene styrene (ABS), or the like). The outer jacket 104 is non-conductive, and is used to insulate the cable shield 120 from objects outside of the electrical cable 100. The outer jacket 104 also protects the cable shield 120 and the other internal components of the electrical cable 100 from mechanical forces, contaminants, and elements (such as fluctuating temperature and humidity). Optionally, the outer jacket 104 may be extruded or otherwise molded around the cable shield 120. Alternatively, the outer jacket 104 may be wrapped around the cable shield 120 or heat shrunk around the cable shield 120.

Figure 2:
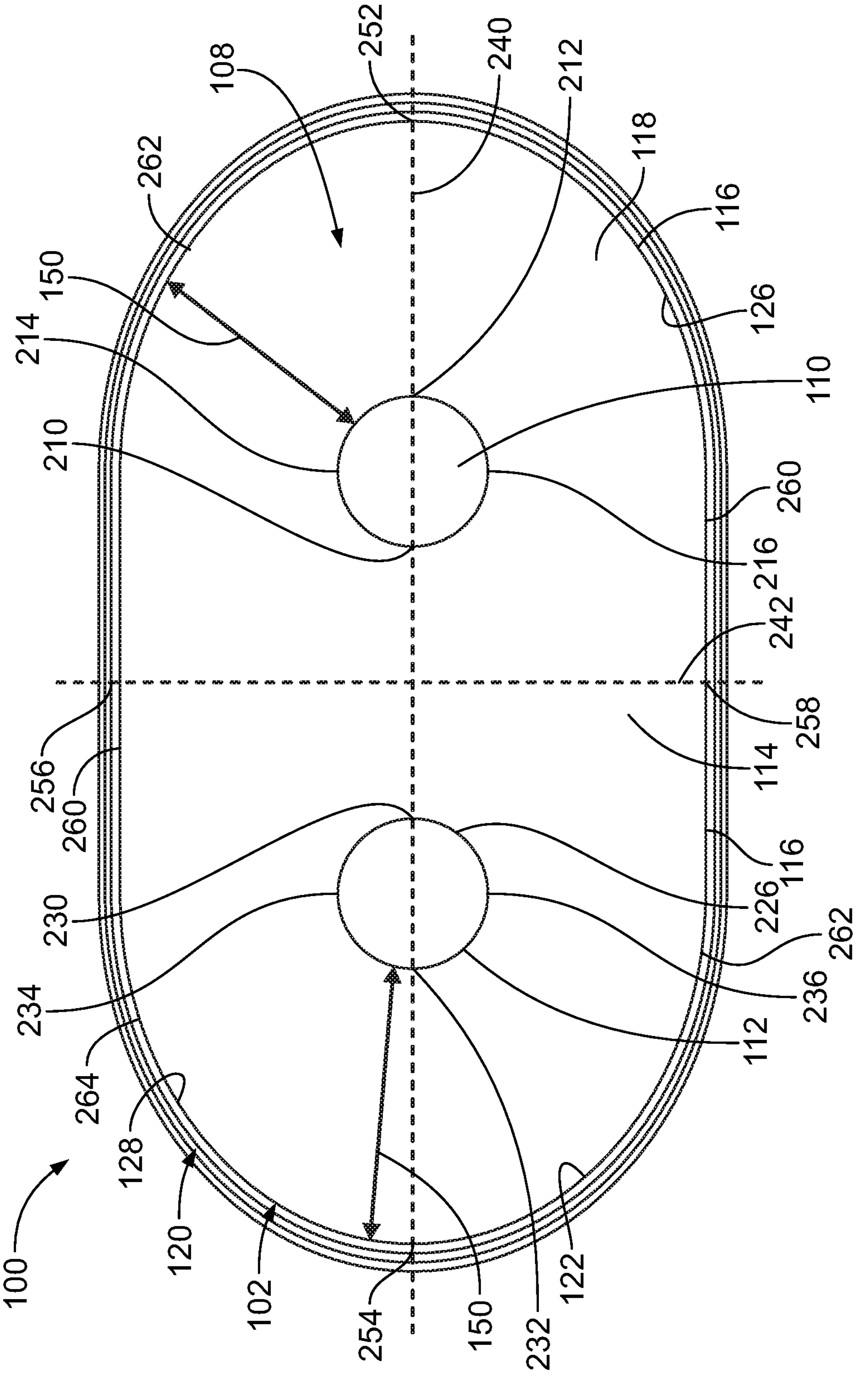
FIG. 2 is a cross-sectional view of a conductor assembly of the electrical cable in accordance with an exemplary embodiment.

FIG. 2 is a cross-sectional view of the conductor assembly 102 in accordance with an exemplary embodiment. The conductive layer 122 is a direct metallization of the insulator 114 by applying the shield structure directly to the outer surface 116 of the insulator 114. In an exemplary embodiment, the extruded body 118 of the insulator 114 is processed to smooth the outer surface 116 prior to applying the conductive layer 122 to the outer surface 116. By lowering a surface roughness of the outer surface 116 prior to applying the conductive layer 122 to the insulator 114, the surface roughness of an interior surface 126 of the conductive layer 122 has a correspondingly lowered surface roughness. As such, a shield surface 128, which is the surface of the cable shield 120 that faces the conductors 110, 112, has a lower surface roughness as compared to a hypothetical, un-smoothed conductive layer applied to a hypothetical extruded body that is unsmoothed. The conductivity of the cable shield 120 is enhanced by lowering the surface roughness of a shield surface 128 (e.g., interior surface 126). Surface roughness tends to crowd current into the highest points of the rough surface profile, which increases insertion loss. By smoothing the surface, the current is less crowded, resulting in a decrease in insertion loss and thus enhanced performance.

In an exemplary embodiment, the electrical cable 100 may be manufactured to reduce skew imbalance by eliminating a void or air pocket under the cable shield that is common in conventional electrical cables that utilize a longitudinal wrap to form the cable shield. For example, rather than having a wrapped cable shield, the electrical cable 100 includes the conductive layer 122 applied directly to the outer surface 116 of the insulator 114. The conductive layer 122 follows the contour of the outer surface 116 without any air voids between the conductive layer 122 and the outer surface 116. For example, the conductive layer 122 may be a metallized conductive layer applied directly to the outer surface 116. Having the conductive layer 122 symmetric about the conductors 110, 112 balances the skew effects of the cable shield 120 on the conductors 110, 120 leading to a zero skew or near-zero skew effect.

The conductive layer 122 of the cable shield 120 provides circumferential shielding around the pair 108 of conductors 110, 112 at a shield distance 150 between the conductors 110, 112 and the shield structure. The distance 150 is generally defined by a thickness of the insulator 114. The shield distance 150 may be variable around the conductor assembly 102, such as due to the shape of the outer surface 116 and the positioning of the conductors 110, 112 within the insulator 114. The conductive layer 122 conforms to the shape of the insulator 114 around the entire outer surface 116. In various embodiments, the direct metallization of the outer surface 116 of the insulator 114, which defines the conductive layer 122, positions the shield structure at a defined shield distance 150 selected to control electrical performance, such as to control capacitance, inductance, skew, impedance, and the like.

In an exemplary embodiment, the conductive layer 122 may include conductive particles applied to the insulator 114 as a continuous coating on the outer surface 116. In various embodiments, the conductive particles are silver particles; however the conductive particles may be other metals or alloys in alternative embodiments. The conductive particles may be initially applied with non-conductive particles, such as binder material, some or all of which may be later removed, such as during a curing, drying or other process. For example, the conductive particles may be conductive particles applied by printing, spraying, bathing or other application processes. For example, the conductive layer 122 may be a silver (or other metal, such as copper, aluminum and the like) coating applied to the outer surface 116. The coated material may be processed, for example, cured or partially cured, to form the conductive layer 122. In various embodiments, the conductive layer 122 may be applied using a dipping bath, such as in a metal bath solution, and processed with IR heating in one or more passes. In various embodiments, the coating material may be dissolved metal material that is applied and cured to leave metal crystals behind as the conductive layer. In various embodiments, the conductive layer 122 may include conductive ink applied to the insulator 114, such as during an ink printing or other ink applying process. The conductive ink may be silver ink or other metal ink. In various embodiments, the conductive ink is a metal solution having dissolved metal in a solution. The conductive ink may be recrystallized on the outer surface of the insulator 114 to form the conductive layer on the outer surface of the insulator 114.

In an exemplary embodiment, the conductive layer 122 is a homogenous coating layer. The conductive layer 122 may be applied in multiple passes or layers to thicken the conductive layer 122 to control the volume of conductive material in the conductive layer 122. The layers may be fully cured between applications in various embodiments. The layers may be partially cured between applications in other alternative embodiments. In some embodiments, a dielectric layer (not shown) may be applied to the conductive layer 122 to protect the conductive layer 122. In an exemplary embodiment, the electrical cable 100 is manufactured on a reel-to-reel processing line and the conductive ink application and recrystallization occurs, post-extrusion, as the electrical cable 100 is transferred reel-to-reel.

In other various embodiments, the conductive particles may be deposited by other processes. For example, in various embodiments, the conductive layer 122 is plated on the outer surface 116. For example, a seed layer may be applied to the outer surface 116 and then the seed layer may be plated with a plating layer. The plating layer may be applied by electro-less plating or electroplating. In other various embodiments, the conductive layer 122 may include metal particles sprayed on the insulator 114, such as through a thermal spraying process. The metal particles may be heated and/or melted and sprayed onto the outer surface 116 to form the conductive layer 122. The metal particles may be heated to fuse the metal particles together on the insulator 114 to form a continuous layer on the outer surface 116. Other processes may be used to apply the conductive layer 122 to the insulator 114, such as a physical vapor deposition (PVD) process. In various embodiments, the conductive layer 122 is dip coated onto the insulator 114 such as with a conductive ink. In other various embodiments, the conductive layer 122 may be spray coated onto the insulator 114.

The insulator 114 may be processed prior to application of the conductive layer 122. In an exemplary embodiment, the extruded body 118 is heat treated to smooth the outer surface 116. Heating the extruded body 118 lowers the surface roughness of the surface profile of the extruded body 118, leading to a smoother outer surface 116 as compared to the surface roughness of the extruded body 118 without heat treatment. In an exemplary embodiment, the extruded body 118 is heat treated to lower the surface roughness (Rq) to a root mean square (RMS) roughness of less than 1.0 μm for a length of the electrical cable 100. In various embodiments, the extruded body 118 is heat treated to lower the surface roughness Rq to less than 0.5 μm for a length of the electrical cable 100. In an exemplary embodiment, the heat treatment lowers the surface roughness Rq by at least 50%. For example, in various embodiments, the untreated extruded body 118 has a surface roughness of approximately 1.5 μm, whereas the heat treated, smoothed extruded body 118 has a surface roughness of less than 0.75 μm. In other various embodiments, the extruded body 118 may be smoothed by other processes, such as chemical processing, abrasion processing, and the like. In an exemplary embodiment, the smoothed outer surface 116 has an RMS roughness (surface roughness Rq) corresponding to a loss of less than 6.0 dB/meter at a frequency of 28.0 GHz.

The insulator 114 may undergo other processes prior to application of the conductive layer 122, such as processing the extruded body 118 with cleaning agents or other chemicals. The outer surface 116 may be processed with corona discharge to increase adhesion of the conductive layer 122. The conductive layer 122 may be processed after application, such as with heat or chemicals to cure the conductive layer 122. The conductive layer 122 may include multiple layers built up during processing, such as by multiple passes through one or more processing steps.

The first conductor 110 has an inner end 210 facing the second conductor 112 and an outer end 212 opposite the inner end 210. The first conductor 110 has a first side 214 (for example, a top side) and a second side 216 (for example, a bottom side) opposite the first side 214. The first and second sides 214, 216 are equidistant from the inner and outer ends 210, 212.

The second conductor 112 has an inner end 230 facing the first conductor 110 and an outer end 232 opposite the inner end 230. The second conductor 112 has a first side 234 (for example, a top side) and a second side 236 (for example, a bottom side) opposite the first side 234. The first and second sides 234, 236 are equidistant from the inner and outer ends 230, 232.

The conductor assembly 102 extends along a lateral axis 240 bisecting the first and second conductors 110, 112, such as through the inner ends 210, 230 and the outer ends 212, 232. Optionally, the lateral axis 240 may be centered in the insulator 114. The conductor assembly 102 extends along a transverse axis 242 centered between the first and second conductors 110, 112, such as centered between the inner ends 210, 230 of the first and second conductors 110, 112. Optionally, the transverse axis 242 may be centered in the insulator 114. In an exemplary embodiment, the transverse axis 242 is located at the magnetic center of the cable core between the first and second conductors 110, 112. In an exemplary embodiment, the longitudinal axis 115 (shown in FIG. 1), the lateral axis 240 and the transverse axis 242 are mutually perpendicular axes. In an exemplary embodiment, the insulator 114 is symmetrical about the lateral axis 240 and the transverse axis 242. In an exemplary embodiment, the conductive layer 122, which is applied directly to the outer surface 116 of the insulator 114, is symmetrical about the lateral axis 240 and the transverse axis 242.

In an exemplary embodiment, the outer surface 116 has a generally elliptical or oval shape defined by a first end 252, a second end 254 opposite the first end 252, a first side 256 (for example, a top side) and a second side 258 (for example, a bottom side) opposite the first side 256. The first and second sides 256, 258 may have flat sections 260 and may have curved sections 262, such as at the transitions with the first and second ends 252, 254. The first and second ends 252, 254 have curved sections 264 that transition between the first and second sides 256, 258. The material of the insulator 114 between the conductors 110, 112 and the outer surface 116 has a thickness. Optionally, the thickness may be uniform. Alternatively, the thickness may vary, such as being narrower at the first and second sides 256, 258 and being widest at the centroids of the first and second ends 252, 254.

The insulator thickness defines the shield distance 150 between the conductive layer 122 and/or the cable shield 120 and the corresponding conductors 110, 112. The shield distance 150 affects the electrical characteristics of the signals transmitted by the conductors 110, 112. For example, the shield distance 150 may affect the delay or skew of the signal, the insertion loss of the signal, the return loss of the signal, and the like. The dielectric material between the shield structure and the corresponding conductors 110, 112 affects the electrical characteristics of the signals transmitted by the conductors 110, 112. The smoothness of the outer surface 116 controls the roughness profile of the shield surface 128, which affects electrical characteristics of the electrical cable 100, such as insertion loss, return loss, and the like. By heat treating the outer surface 116 prior to applying the conductive layer 122 directly to the outer surface 116, the surface roughness Rq of the conductive layer 122 may be improved compared to embodiments that do not heat treat and smooth the outer surface 116. By smoothing the outer surface 116 of the insulator 114, the conductive layer 122 has a more uniform thickness, have an improved bulk resistance for electrical transmission. For example, the inner surface of the conductive layer 122 may be more smooth, leading to lower peaks and higher valleys compared to an unsmoothed surface, leading to a more uniform thickness profile along the length of the electrical cable 100.

Figure 3:
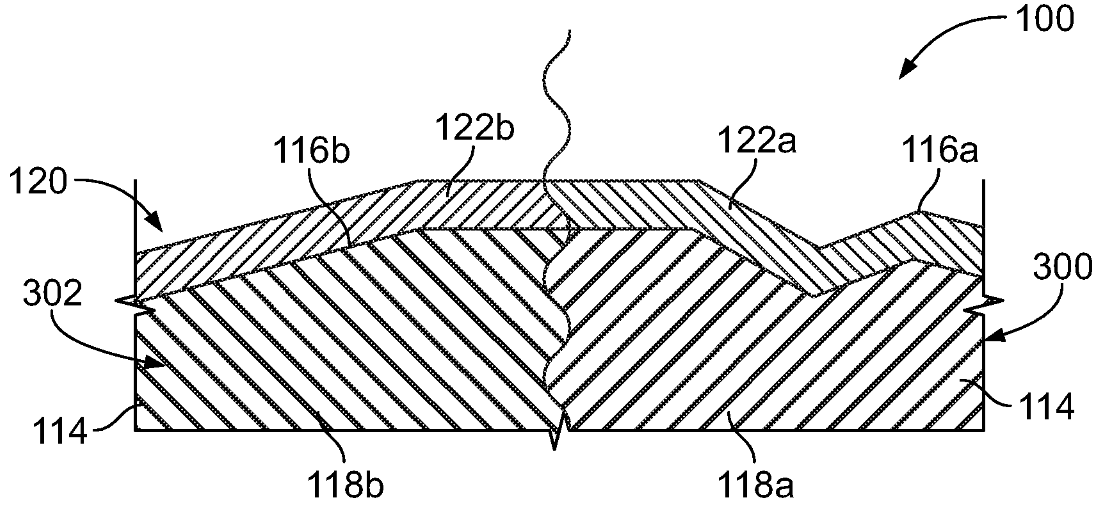
FIG. 3 is a schematic, cross-sectional view of a portion of the electrical cable showing a rough portion and a smooth portion of the electrical cable.

FIG. 3 is a schematic, cross-sectional view of a portion of the electrical cable 100, showing a first portion 300 having the extruded body **118*a* and the conductive layer 122*a* that is unsmoothed and a second portion 302 having the extruded body 118*b* and the conductive layer 122*b* that is smoothed to compare the surface roughness along such portions 300, 302. In an exemplary embodiment, the entire extruded body 118 would be smoothed, and thus the schematic illustration in FIG. 3** is for comparison purposes only.

During manufacturing of the electrical cable 100, the insulator 114 is extruded around the conductors 110, 112. After extrusion, the extruded body 118 is heated to lower the roughness profile of the outer surface 116. The conductive layer 122 is then directly applied to the outer surface 116 of the insulator 114. As shown in FIG. 3, the conductive layer 122 follows the contour of the outer surface 116. As such, when the extruded body **118*a* is untreated, the outer surface 116*a* has a higher surface roughness (Rq). For example, the outer surface 116*a* has higher average variability between peaks and valleys of the surface profile (compared to the treated outer surface 116***b*). In contrast, when the extruded body 118*b* is heat treated, the outer surface 116*b* has a lower surface roughness (Rq). For example, the outer surface 116*b* has a lower average variability between peaks and valleys of the surface profile (compared to the untreated outer surface 116*a*). In various examples, the untreated outer surface 116*a* has a surface roughness Rq of 1.4 μm, whereas the treated outer surface 116*b* has a surface roughness Rq of 0.4 micrometers. In such examples, these surface roughness improvements that insertion loss improvements of up to 2 dB/meter for a 30 AWG cable, out of a total budget of 5 dB/meter.

Figure 4:
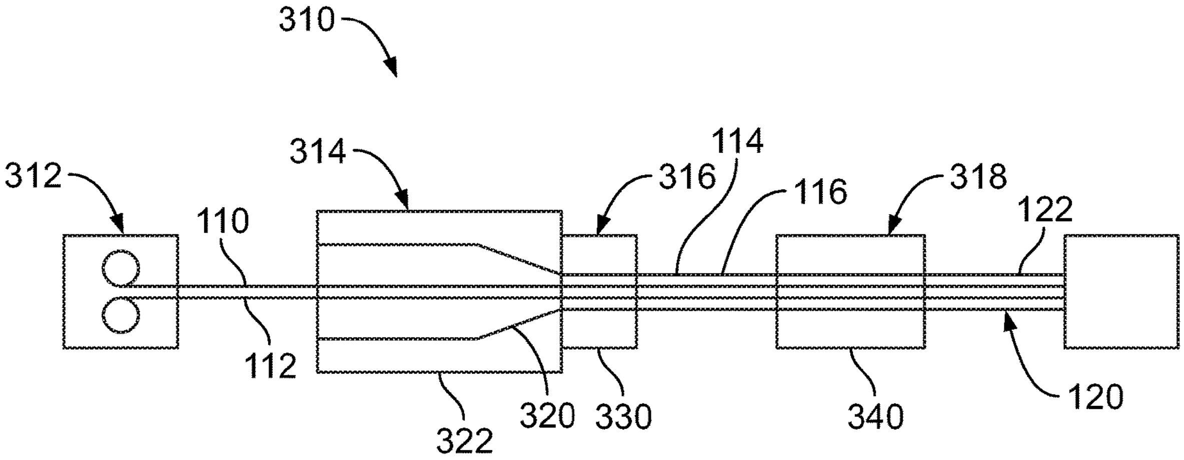
FIG. 4 is a schematic illustration of a cable manufacturing system in accordance with an exemplary embodiment.

FIG. 4 is a schematic illustration of a cable manufacturing system 310 in accordance with an exemplary embodiment. The cable manufacturing system 310 may be a reel-to-reel manufacturing system. The cable manufacturing system 310 includes a conductor feeder 312 used to feed the first and second conductors 110, 112. The cable manufacturing system 310 includes a core extruder 314 used to extrude the insulator 114 around the first and second conductors 110, 112. The conductor feeder 312 feeds the first and second conductors 110, 112 to the core extruder 314. The cable manufacturing system 310 includes a treatment device 316 for treating the insulator 114. In an exemplary embodiment, the treatment device 316 performs a heat treatment process on the insulator 114 to lower a roughness profile of the outer surface 116 of the insulator 114. The cable manufacturing system 310 includes a cable shield applicator 318 for directly applying the cable shield 120 to the outer surface 116 of the insulator 114.

In an exemplary embodiment, the core extruder 314 includes a tip 320 and a die 322. The tip 320 holds the first and second conductors 110, 112. The die 322 surrounds the tip 320. The material used for forming the insulator 114 is loaded into the core extruder 314 between the tip 320 and the die 322. The tip 320 and the die 322 formed the insulator 114 around the first and second conductors 110, 112.

In an exemplary embodiment, the treatment device 316 includes a heater 330. The heater 330 is used for heating the extruded body 118 of the insulator 114. In an exemplary embodiment, the heater 330 is positioned proximate to the core extruder 314. For example, the heater 330 may be positioned immediately downstream of the core extruder 314. Optionally, the heater 330 may surround the tip 320 and/or the die 322. In other various embodiments, the heater 330 may be positioned remote from and spaced apart from the core extruder 314. The heater 330 increases the temperature of the extruded body 118. As the temperature of the extruded body 118 is increased, the roughness profile of the outer surface 116 of the insulator 114 may be lowered. The heater 330 is used to smooth the outer surface 116 of the insulator 114. The heater 330 is positioned upstream of the cable shield applicator 318. Other devices may be positioned between the treatment device 316 and the cable shield applicator 318. For example, a cooling bath may be located between the treatment device 316 and the cable shield applicator 318 to lower the temperature of the cable core prior to applying the cable shield 122 the outer surface 116.

The cable shield applicator 318 includes an application device 340. For example, the application device 340 may be a bath that the cable core passes through. In other various embodiments, the application device 340 may be a sprayer. Other types of application devices may be used in alternative embodiments for applying the conductive layer 122 of the cable shield 120 directly to the outer surface 116 of the insulator 114. In various embodiments, the cable shield applicator 318 applies the conductive layer 122 as a conductive ink on the insulator 114, such as during an ink printing or other ink applying process. The conductive ink may be silver ink or other metal ink. In various embodiments, the conductive ink is a metal solution having dissolved metal in a solution. In various embodiments, the cable shield applicator 318 is used to process the conductive ink to recrystallize the conductive ink to form the conductive layer 122 on the outer surface of the insulator 114. The recrystallization may occur due to curing or processing, such as using an IR heating process. The cable shield applicator 318 may include other devices, such as a curing device for curing the conductive layer 122. The curing device may be a heater, an IR device, or another type of curing device. The cable shield applicator 318 may include other devices, such as a plated device for pleading the conductive layer 122 to increase a sickness of the conductive layer 122 after the conductive layer 122 is initially applied directly to the insulator 114.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical cable comprising:

a conductor assembly having a first conductor, a second conductor and an insulator surrounding the first conductor and the second conductor, the insulator having a curved outer surface, the curved outer surface being a surface that has not been roughened having a root means square (RMS) roughness of less than 0.6 μm for a length of the electrical cable; and a cable shield providing electrical shielding for the first and second conductors, the cable shield having a metallized conductive layer on the outer surface of the insulator, the metallized conductive layer being curved to surround the curved outer surface, the cable shield extending along the longitudinal axis.

2. The electrical cable of claim 1, wherein the metallized conductive layer is applied directly to the outer surface.

3. The electrical cable of claim 1, wherein the metallized conductive layer includes an inner surface directly engaging the outer surface of the insulator, the inner surface having an RMS roughness of less than 0.6 μm.

4. The electrical cable of claim 1, wherein the insulator includes an extruded body, the extruded body being treated after extrusion to define the outer surface having the RMS roughness of less than 0.6 μm.

5. The electrical cable of claim 4, wherein the extruded body is treated by applying heat to the extruded body after extrusion to lower a surface roughness of the outer surface.

6. The electrical cable of claim 1, wherein the RMS roughness of the outer surface corresponds to a loss of less than 6.0 dB/meter at a frequency of 28.0 GHz.

7. The electrical cable of claim 1, wherein the metallized conductive layer is a coating layer applied directly to the outer surface of the insulator.

8. The electrical cable of claim 1, wherein the outer surface has a RMS roughness of less than 0.5 μm.

9. The electrical cable of claim 1, wherein the outer surface has a RMS roughness of between 0.4 μm and 0.6 μm.

10. An electrical cable comprising:

a conductor assembly having a first conductor, a second conductor and an insulator surrounding the first conductor and the second conductor, the insulator having an extruded body surrounding the first and second conductors and having an outer surface, the outer surface of the extruded body being a surface that has not been roughened, the outer surface of the extruded body being treated to lower a surface roughness of the outer surface to a root means square (RMS) roughness of less than 0.6 μm for a length of the electrical cable; and a cable shield providing electrical shielding for the first and second conductors, the cable shield having a metallized conductive layer directly applied to the treated outer surface of the insulator with the lowered surface roughness, the cable shield extending along the longitudinal axis.

11. The electrical cable of claim 10, wherein the metallized conductive layer includes an inner surface directly engaging the outer surface of the insulator, the inner surface having an RMS roughness of less than 0.6 pm.

12. The electrical cable of claim 10, wherein the extruded body is treated by applying heat to the extruded body after extrusion to lower a surface roughness of the outer surface.

13. The electrical cable of claim 10, wherein the RMS roughness of the outer surface corresponds to a loss of less than 6.0 dB/meter at a frequency of 28.0 GHz.

14. The electrical cable of claim 10, wherein the metallized conductive layer is a coating layer applied directly to the outer surface of the insulator.

15. The electrical cable of claim 10, wherein the outer surface has a RMS roughness of less than 0.5 μm.

16. The electrical cable of claim 10, wherein the outer surface has a RMS roughness of between 0.4 μm and 0.6 μm.

* * * * *